United States Patent
Gordaninejad et al.

(10) Patent No.: US 6,471,018 B1
(45) Date of Patent: *Oct. 29, 2002

(54) MAGNETO-RHEOLOGICAL FLUID DEVICE

(75) Inventors: Faramarz Gordaninejad, Reno, NV (US); Shawn P. Kelso, Fremont, CA (US)

(73) Assignee: Board of Regents of the University and Community College System on Behalf of the University of Nevada-Reno, The University of Reno, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/443,351

(22) Filed: Nov. 19, 1999

Related U.S. Application Data

(60) Provisional application No. 60/109,187, filed on Nov. 20, 1998.

(51) Int. Cl.[7] .................................................. F16F 9/53
(52) U.S. Cl. ........................... 188/267.1; 188/322.19; 188/322.22
(58) Field of Search ......................... 188/267.1, 267, 188/267.2, 269, 322.15, 322.22, 322.19; 267/140.14

(56) References Cited

U.S. PATENT DOCUMENTS

| | | | |
|---|---|---|---|
| 2,557,140 A | 6/1951 | Razowitz | 285/109 |
| 2,575,360 A | 11/1951 | Rabinow | 192/21.5 |
| 2,635,483 A | 4/1953 | Welsh | 74/574 |
| 2,661,596 A | 12/1953 | Winslow | 60/52 |
| 2,661,825 A | 12/1953 | Winslow | 192/21.5 |
| 2,663,809 A | 12/1953 | Winslow | 310/78 |
| 2,667,237 A | 1/1954 | Rabinow | 188/88 |
| 2,669,325 A | 2/1954 | Raines | 188/1 |
| 2,692,582 A | 10/1954 | Curci et al. | 121/38 |

(List continued on next page.)

FOREIGN PATENT DOCUMENTS

| | | |
|---|---|---|
| DE | 1 084 528 | 6/1960 |
| DE | 3631107 A1 | 3/1988 |
| DE | 3800678 A1 | 7/1989 |
| EP | 0 297 608 A1 | 1/1989 |
| FR | 1.094.516 | 5/1955 |
| GB | 756107 | 8/1956 |
| GB | 1 282 568 | 7/1972 |
| GB | 2 186 947 A | 8/1987 |
| JP | 58-113644 | 7/1983 |
| JP | 58-221034 | 12/1983 |
| JP | 63-001833 | 1/1988 |
| JP | 63-180742 | 7/1988 |
| JP | 63-210432 | 9/1988 |
| JP | 63-231031 | 9/1988 |
| JP | 5-162524 | 6/1993 |
| SU | 1248875 A1 | 8/1986 |
| SU | 1249229 | 8/1986 |
| WO | WO 98/04846 | 2/1998 |

*Primary Examiner*—Pam Rodriguez
(74) *Attorney, Agent, or Firm*—Morgan, Lewis & Bockius LLP

(57) ABSTRACT

A magneto-rheological fluid device including a housing defining a cavity, a piston slidably disposed in the cavity to divide the cavity into first and second portions, a passage defined on an exterior surface of the piston fluidly coupling the first and second portions of the cavity, a magneto-rheological fluid disposed in the cavity such that motion of the piston is damped by flow of the magneto-rheological fluid through the passage and a magnet disposed to produce a magnetic field within the cavity substantially parallel to the motion of the piston at the exterior surface of the piston.

18 Claims, 11 Drawing Sheets

U.S. PATENT DOCUMENTS

| | | | |
|---|---|---|---|
| 2,733,792 A | 2/1956 | Saxl | 192/21.5 |
| 2,846,028 A | 8/1958 | Gunther | 188/88 |
| 2,940,749 A | 6/1960 | Kemelhor | 269/1 |
| 2,973,969 A | 3/1961 | Thall | 280/124 |
| 3,006,656 A | 10/1961 | Schaub | 280/112 |
| 3,059,915 A | 10/1962 | Kemelhor | 267/1 |
| 3,174,587 A | 3/1965 | Walton | 188/67 |
| 3,321,210 A | 5/1967 | Delchev | 280/6 |
| 3,538,469 A | 11/1970 | Litte et al. | 335/219 |
| 3,543,901 A | 12/1970 | Lengsfeld et al. | 192/107 |
| 3,550,048 A | 12/1970 | Stallman | 355/193 |
| 3,941,402 A | 3/1976 | Yankowski et al. | 280/124 R |
| 4,122,922 A | 10/1978 | Baermann | 188/267 |
| 4,200,003 A | 4/1980 | Miller | 74/574 |
| 4,351,515 A | 9/1982 | Yoshida | 267/8 R |
| 4,401,298 A | 8/1983 | Eaton et al. | 267/140.1 |
| 4,416,445 A | 11/1983 | Coad | 267/35 |
| 4,517,505 A | 5/1985 | Cunningham | 318/611 |
| 4,544,048 A | 10/1985 | Hoffman | 188/251 A |
| 4,583,723 A | 4/1986 | Ozawa | 267/140.1 |
| 4,673,067 A | 6/1987 | Münning et al. | 188/299 |
| 4,679,775 A | 7/1987 | Funaki et al. | 267/64.27 |
| 4,699,348 A | 10/1987 | Freudenberg | 248/550 |
| 4,709,779 A | 12/1987 | Takehara | 180/300 |
| 4,741,519 A | 5/1988 | Dubos et al. | 267/140.1 |
| 4,753,421 A | 6/1988 | Makibayashi et al. | 267/140.1 |
| 4,789,142 A | 12/1988 | Hoying et al. | 267/140.1 |
| 4,819,772 A | 4/1989 | Rubel | 188/299 |
| 4,844,220 A | 7/1989 | Maji et al. | 188/267 |
| 4,869,476 A | 9/1989 | Shtarkman | 267/140.1 |
| 4,872,652 A | 10/1989 | Rohner et al. | 267/140.1 |
| 4,880,216 A | 11/1989 | Härtel et al. | 267/140.1 |
| 4,896,587 A | 1/1990 | Mintgen | 92/165 R |
| 4,896,752 A | 1/1990 | Shtarkman | 188/299 |
| 4,899,996 A | 2/1990 | Maassen et al. | 267/140.1 |
| 4,921,272 A | 5/1990 | Ivers | 280/707 |
| 4,942,947 A | 7/1990 | Shtarkman | 188/267 |
| 4,973,031 A | 11/1990 | Takano et al. | 267/140.1 |
| 4,981,286 A | 1/1991 | Kato et al. | 267/140.1 |
| 4,992,190 A | 2/1991 | Shtarkman | 252/62.52 |
| 5,018,606 A | 5/1991 | Carlson | 188/267 |
| 5,029,677 A | 7/1991 | Mitsui | 188/267 |
| 5,052,662 A | 10/1991 | Doi | 267/140.1 |
| 5,080,392 A | 1/1992 | Bazergui | 280/707 |
| 5,176,368 A | 1/1993 | Shtarkman | 267/140.14 |
| 5,265,703 A | 11/1993 | Ackermann | 188/299 |
| 5,277,281 A | 1/1994 | Carlson et al. | 188/267 |
| 5,283,234 A | 2/1994 | Wang et al. | 505/1 |
| 5,284,330 A | 2/1994 | Carlson et al. | 267/140.14 |
| 5,285,878 A | 2/1994 | Scheffel et al. | 188/319 |
| 5,293,969 A | 3/1994 | Yamaoka et al. | 188/299 |
| 5,301,776 A | 4/1994 | Beck | 188/322.13 |
| 5,303,803 A | 4/1994 | Grün et al. | 188/299 |
| 5,303,804 A | 4/1994 | Spiess | 188/319 |
| 5,318,157 A | 6/1994 | Kempf | 188/299 |
| 5,353,839 A | 10/1994 | Kordonsky et al. | 137/806 |
| 5,375,683 A | 12/1994 | Huang et al. | 188/299 |
| 5,382,373 A | 1/1995 | Carlson et al. | 252/62.55 |
| 5,389,905 A | 2/1995 | Shibata et al. | 335/78 |
| 5,392,883 A | 2/1995 | Huang et al. | 188/282 |
| 5,398,917 A | 3/1995 | Carlson et al. | 267/140.14 |
| 5,409,088 A | 4/1995 | Sönseröd | 188/299 |
| 5,413,196 A | 5/1995 | Förster | 188/299 |
| 5,435,421 A | 7/1995 | Beck | 188/299 |
| 5,445,249 A | 8/1995 | Aida et al. | 188/378 |
| 5,454,452 A | 10/1995 | Öhlin | 188/299 |
| 5,462,142 A | 10/1995 | Handke et al. | 188/299 |
| 5,492,312 A | 2/1996 | Carlson | 367/140.14 |
| 5,505,880 A | 4/1996 | Kormann et al. | 252/62.54 |
| 5,509,888 A | 4/1996 | Miller | 600/29 |
| 5,624,010 A | 4/1997 | Huang et al. | 188/299 |
| 5,632,361 A | 5/1997 | Wulff et al. | 188/267 |
| 6,019,201 A | 2/2000 | Gordaninejad et al. | 188/267.1 |

MAGNETO-RHEOLOGICAL FLUID DEVICE

The present invention claims the benefit of U.S. Provisional Patent Application No. 60/109,187, filed Nov. 20, 1998, which is hereby incorporated by reference.. The present application also incorporates by reference U.S. Patent Application Ser. No. 08/901,896, filed Jul. 29, 1997, now U.S. Patent No. 6,019,201.

BACKGROUND OF THE INVENTION

1. Field of the Invention

The present invention relates to a damper, and more particularly to a magnetic-rheological fluid damper.

2. Discussion of the Related Art

During the past decade there has been increasing interest in the development of controllable dampers that utilize electro-rheological fluids (ERF) and magneto-rheological fluids (MRF). The possibility of using ERF or MRF based damping devices in various applications has made these controllable devices attractive to the vibration control field. Controllable dampers can potentially be used in a variety of mechanical systems such as bicycles, motorcycles, automobiles, trucks, ships, trains, airplanes, bridges, buildings, sports equipment and any other systems in which passive, or semi-active vibration control is useful.

Magneto-rheological fluid generally consists of micron-sized particles suspended in a carrier fluid„such as silicon or mineral oils. The particles are ferrous in nature, and therefore become polarized in the presence of a magnetic field. The polarization of the particles results in a magnetic attraction, causing the particles to form chains (or columns) dependent upon field strength. These chains align with the magnetic field lines. The chains of particles in the MRF induce changes in the physical properties of the fluid. One change is an appreciable increase (or decrease) in the yielded stress and the plastic viscosity of the MRF because the chains resist flow. MRF is capable of responding to a change in its magnetic field within a few milliseconds and retains no residual charge.

To produce and control the change in the material properties of MRF, electromagnets and/or permanent magnets are used in conjunction with the housing that contains the fluid. By varying electric current passing through the electromagnet, intensity and strength of the magnetic field can be controlled. The strength of the magnetic field that passes through the region of MRF determines the level of change of the MRF's yielded stress and plastic viscosity. When MRF is used as a replacement for hydraulic fluid in dampers, the varying yielded stress and plastic viscosity produces a varying damping force. The end result is a controllable damper.

One of the most popular applications for controllable dampers is in automobiles, trucks, and other vehicles equipped with shock absorbers. These vehicles have sensors and on-board computers (in varying levels of complexity) that are capable of sensing and actively responding to random excitation inputs such as rough roads, bumps, changes in vehicle mass, etc. Vehicles equipped with active or semi-active suspension systems generally provide increased safety, have improved. vehicle-handling characteristics, and provide a smoother, more comfortable ride.

There are several benefits to MRF controllable dampers as compared to mechanically controlled hydraulic dampers. Mechanically controlled dampers have internal valves and other moving parts that are exposed to great forces and often fail in operation. MRF dampers require no moving internal parts to control damping, thereby reducing the mechanical complexity and cost of the device. An MRF damper is a controllable damper with a fast response time that benefits from a simple, rapid change in material properties of the fluid. The hydraulic fluid components of a mechanically controlled damper are also sensitive to the introduction of impurities. Vehicle dampers are often externally exposed to impurities. MRF dampers are insensitive to the introduction of impurities.

However, current MRF controllable dampers suffer from a number of limitations and undesirable characteristics. Specifically, a magnetic field must be applied to the passage through which the MRF flows. As a result of the magnetic requirements of MRF dampers, ferrous materials have almost been exclusively used in their construction. These ferrous materials provide magnetic pathways for the magnetic fields. However, ferrous materials are relatively heavy in weight. MRF dampers have been typically too heavy for weight-sensitive applications such as fighter aircraft landing gear, racing cars, mountain bicycles, etc. Also, conventional MRF dampers have restrictively small dimensional tolerances in the regions where the magnetic field is applied to the MRF. As a result of the tolerance restrictions, manufacturing methods are difficult and expensive. This type of MRF damper is also sensitive to off-axis loading, as bending and buckling loads affect the tolerance regions. In addition, due to the ferrous particles in the fluid, the fluid is abrasive and affects the same tolerance-sensitive regions, thereby possibly resulting in shorter life span, high-maintenance MRF dampers.

SUMMARY OF THE INVENTION

Accordingly, the present invention is directed to an MRF damper that substantially obviates one or more of the problems due do limitations and disadvantages of the related art.

An object of the present invention is to provide a controllable MRF damper having increased damping.

Another object of the present invention is to provide an MRF damper that can be easily manufactured at a low cost.

Another object of the present invention is to provide an MRF that does not require restrictive dimensional tolerances.

Another object of the present invention is to provide an MRF damper that does not necessarily require the use of ferrous materials.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a magneto-rheological fluid device includes a housing defining a cavity; a piston slidably disposed in the cavity, the piston dividing the cavity into first and second portions; a passage defined on an exterior surface of the piston fluidly coupling the first and second portions of the cavity; a magneto-rheological fluid disposed in the cavity such that motion of the piston is damped by flow of the magneto-rheological fluid through the passage; and a magnet disposed to produce a magnetic field within the cavity substantially parallel to the motion of the piston at the exterior surface of the piston.

In another aspect, a magneto-rheological fluid device includes a housing defining a cavity; a piston slidably disposed in the cavity, the piston dividing the cavity into first and second portions; a passage defined on the piston fluidly coupling the first and second portions of the cavity, the passage having a transverse portion formed along a circumference of the piston; a magneto-rheological fluid disposed in the cavity such that motion of the piston is damped by flow of the magneto-rheological fluid through the passage; and a magnet disposed to produce a magnetic field within the cavity.

In another aspect, a magneto-rheological fluid device includes a housing defining a cavity; a piston slidably disposed in the cavity, the piston dividing the cavity into first and second portions; a passage defined on the piston fluidly coupling the first and second portions of the cavity; a magneto-rheological fluid disposed in the cavity such that motion of the piston is damped by flow of the magneto-rheological fluid through the passage; and a magnet disposed around the housing to produce a magnetic field within the cavity substantially parallel to the motion of the piston at the exterior surface of the piston.

It is to be understood that both the foregoing general description and the following detailed description are exemplary and explanatory and are intended to provide further explanation of the invention as claimed.

BRIEF DESCRIPTION OF THE DRAWINGS

Accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
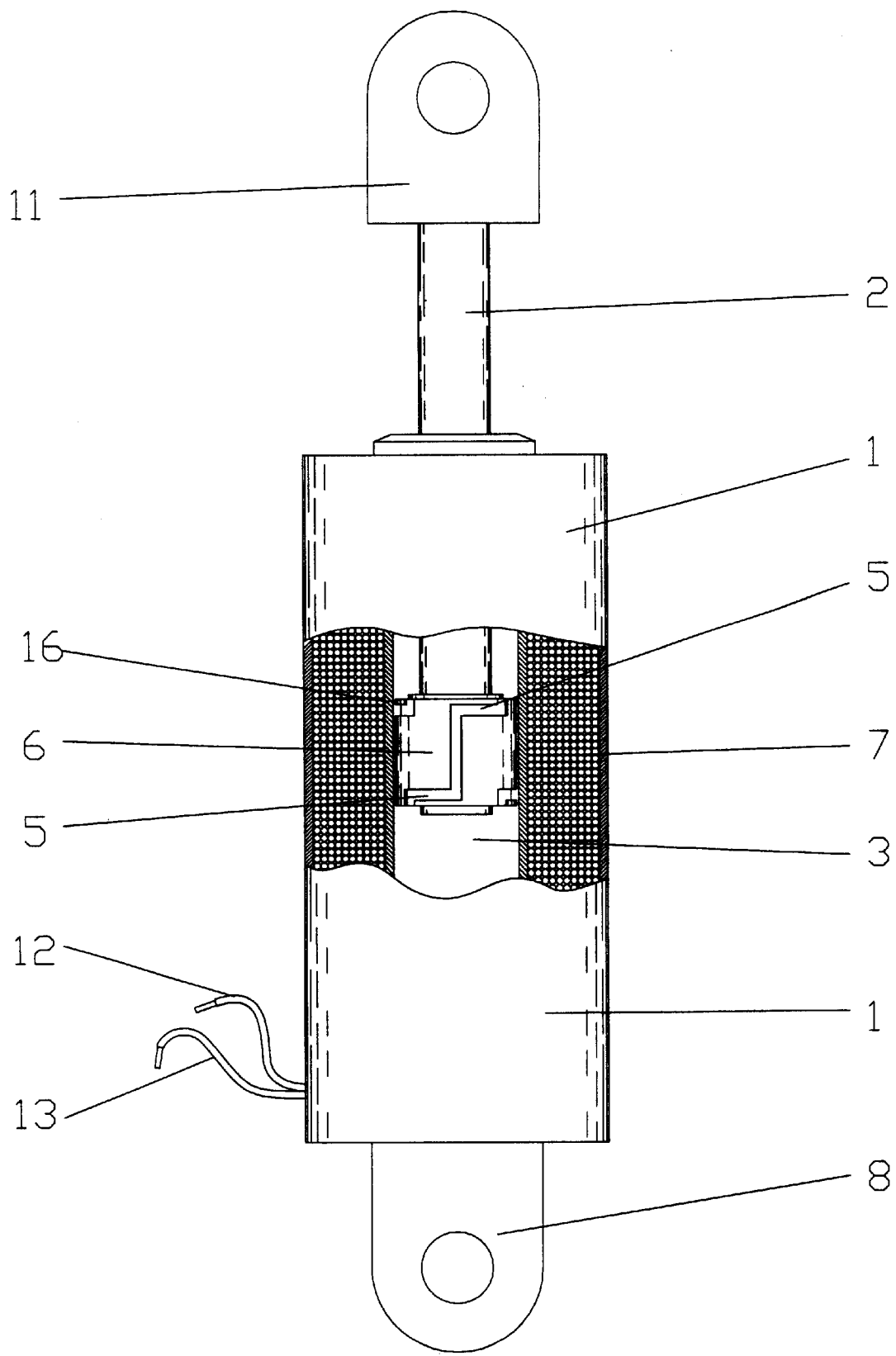
FIG. 1 is a partial cross-sectional view of a MRF damper according to an embodiment of the present invention with the piston being shown in plan view and not in cross-sectional view.

FIG. 1 shows a partial cross-sectional view of an MRF damper according to the present invention. As shown in FIG. 1, the MRF damper includes a housing 16 defining a cavity 3 therein and a piston 6 that divides the cavity 3 of the housing 16 into two portions or chambers. Here, the housing 16 and piston 6 are preferably formed of non-magnetic (non-ferrous) materials, but ferrous materials may also be used. In the embodiment of FIG. 1, the housing 16 is generally cylindrical. The piston 6 is guided axially in the cavity 3 by a piston rod 2. The two portions of the cavity 3 of the housing 16 contain magneto-rheological fluid (MRF). A magnet, such as an electromagnetic coil 7 is disposed surrounding the housing 16 within a cover 1. That is, coil 7 is wound around the housing 16. In addition, the coil 7 provides two external electrical wire leads 12, 13 to connect to an external electrical power source. External mounting pieces 8, 11 are respectively used to secure the ends of the MRF damper. Preferably, one or more passages 5 may be formed on the external surface of the piston 6 to act as the controllable MRF valves.

Figure 2:
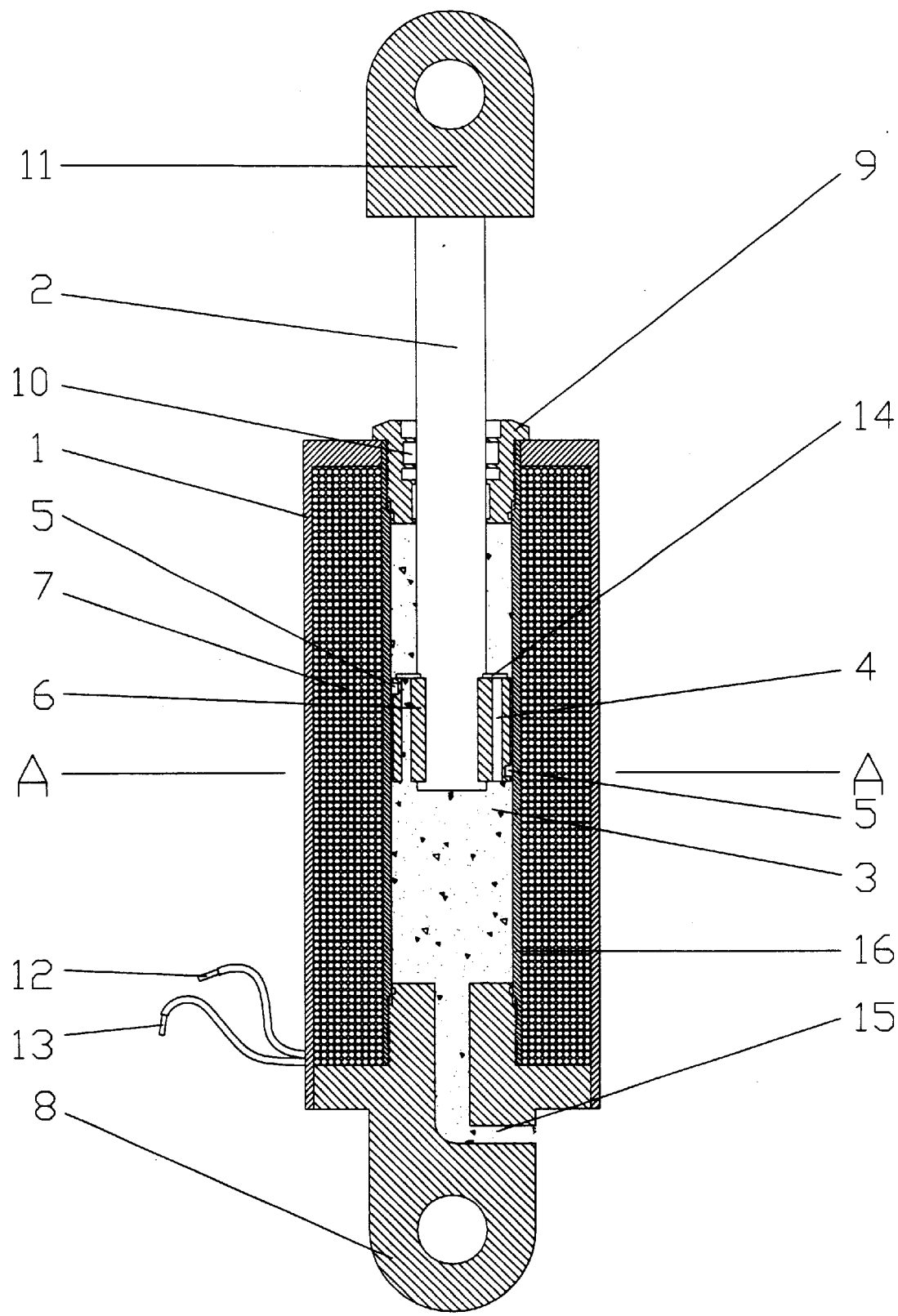
FIG. 2 is a cross-sectional view of the MRF damper of FIG. 1 illustrating the magnetic coil, bypass flow passage(s), MRF flow passages, cylinder housing, piston shaft, cover, seals and accumulator passage.

FIG. 2 is a cross-sectional view of the MRF damper of FIG. 1 illustrating the internal operation of the MRF damper. The piston 6 may include one or more internal passages 4 that are controlled by a valve 14, for example, a spring-backed one-way valve. The valve 14 opens during the compression stroke of the vibration damper when sufficient pressure exists. Using internal passages 4, the MRF damper can tolerate high impact forces or can be controlled for different compression and rebound characteristics. The piston rod 2 has an external mounting piece 11 at one end and is attached to the piston 6 at the other end. The volume of the cavity 3 within the housing 16 not occupied by piston 6 and piston rod 2 contains MRF. The top end of the housing 16 is sealed using an end-cap 9 and an 0-ring pack 10 or other suitable seal to prevent leakage of the MRF fluid, to prevent air from entering, and to align the piston rod 2. At the bottom end, a port 15 is provided to provide a passage for MRF 3 to an external and/or internal accumulator (not shown). The accumulator accommodates for changes in MRF volume within the housing 16 as the piston 6 and piston rod 2 reciprocate inside the cylinder housing 16. The accumulator may alternatively be incorporated into the vibration damper. The damper housing cover 1 surrounds the coil of magnetic wire 7 whose electrical wire leads 12 and 13 extend through the cover 1 to the outside of the MRF damper.

Figure 3:
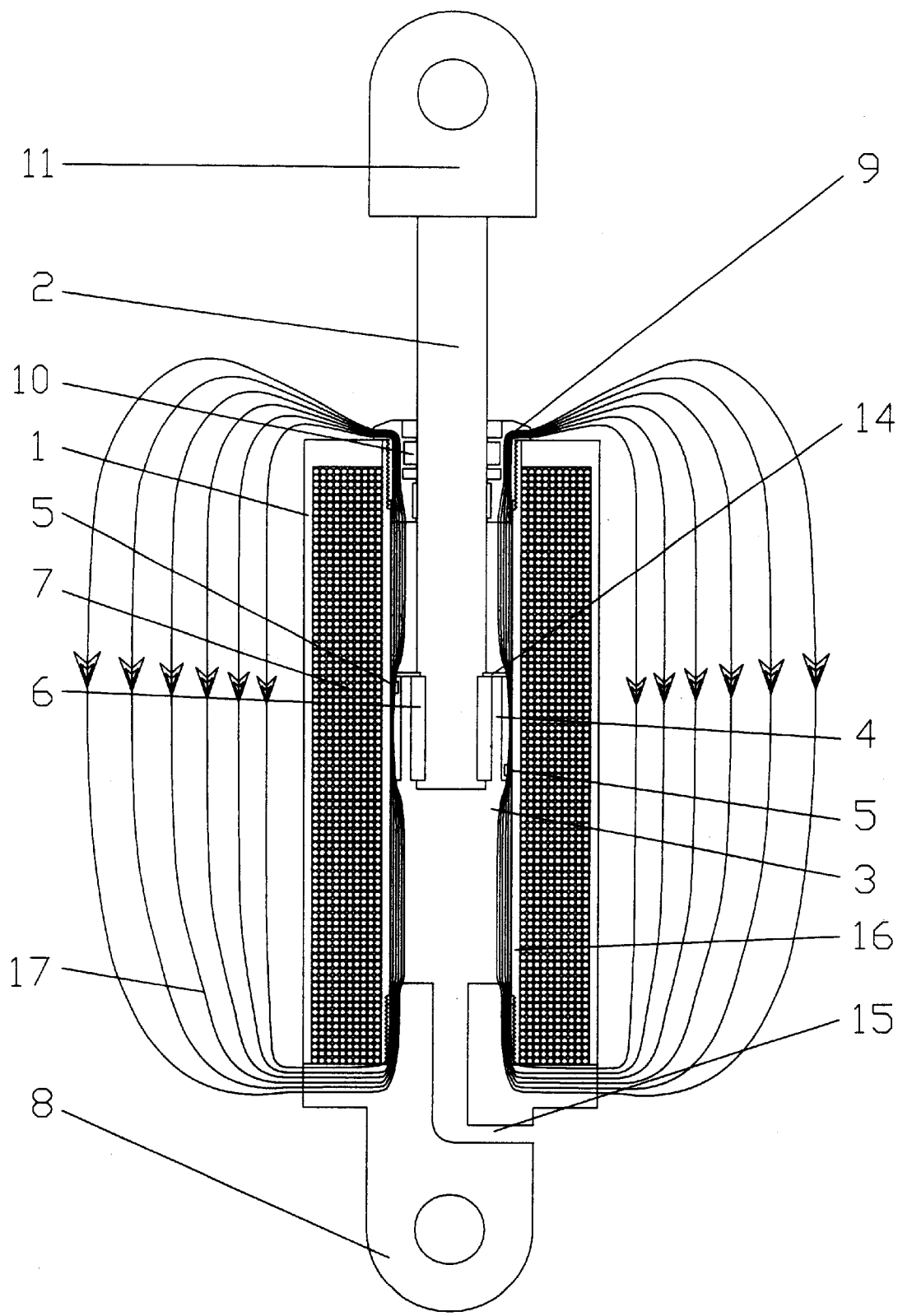
FIG. 3 is a cross-sectional view of the MRF damper of FIG. 1 illustrating magnetic field.

FIG. 3 is a cross-sectional view of the MRF damper of FIG. 1 showing the magnetic field lines 17 that result when electrical current is introduced to the coil 7. The ferrous particles of the MRF form chains along the magnetic field lines when subjected to the magnetic field. As a result, the yielded stress and the plastic viscosity of the MRF is increased, thereby achieving the desired level of damping. In FIG. 3, the magnetic field lines affecting the passages 5 are illustrated. However, if the piston 6 and piston shaft 2 are formed of magnetically inactive materials, the magnetic field will be present through the entire cavity. In addition, since the passages 5 are formed on the exterior surface of the piston 6, it may be desired to increase the magnetic field near the surface of the housing 16. Thus, the magnetic field may be concentrated near the surface of the housing 16 by forming poles at end of the housing 16 using, for example ferrous end caps 9, housing 16 and/or cover 1. Moreover, the magnetic field will be increased in the passage 5 due to the presence of the ferrous particles in the MRF.

Figure 4:
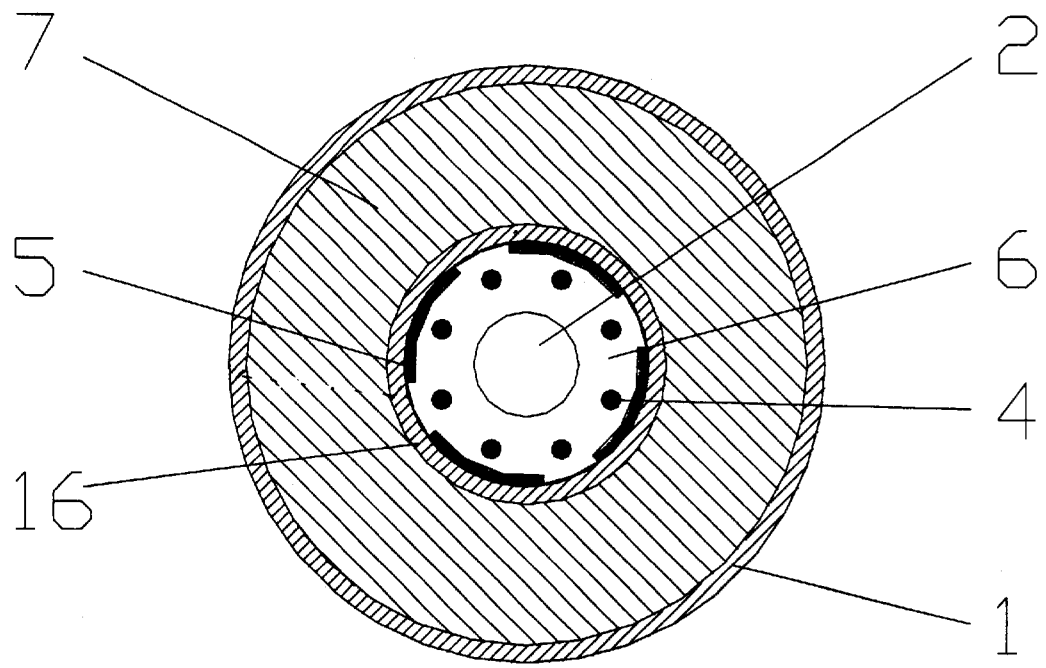
FIG. 4 is a top cross-sectional view of the MRF damper of FIG. 1.

FIG. 4 is a cross-sectional top view of the MRF damper taken along line A—A of FIG. 2. As described above, the piston rod 2 contains and supports the piston 6. The internal passages 4 in the piston 6 may serve as bypass and/or compression ports. The piston 6 has one or more passages 5 on the exterior of the piston 6. Here, the internal passages 4 and the exterior passages 5 are dark-shaded to represent the MRF contained therein. Also, the MRF 3 can act as a film lubricant between the cylinder housing 16 and the piston 6. Alternatively, a piston seal may be utilized. The electromagnetic coil 7 surrounds the piston 6 and the housing 16 to provide the magnetic field. Preferably, the cover 1 is provided to protect the electromagnetic coil 7. In addition, the cover 1 may provide a return magnetic field circuit pathway if the cover 1 is formed of a ferrous material.

Figure 5:
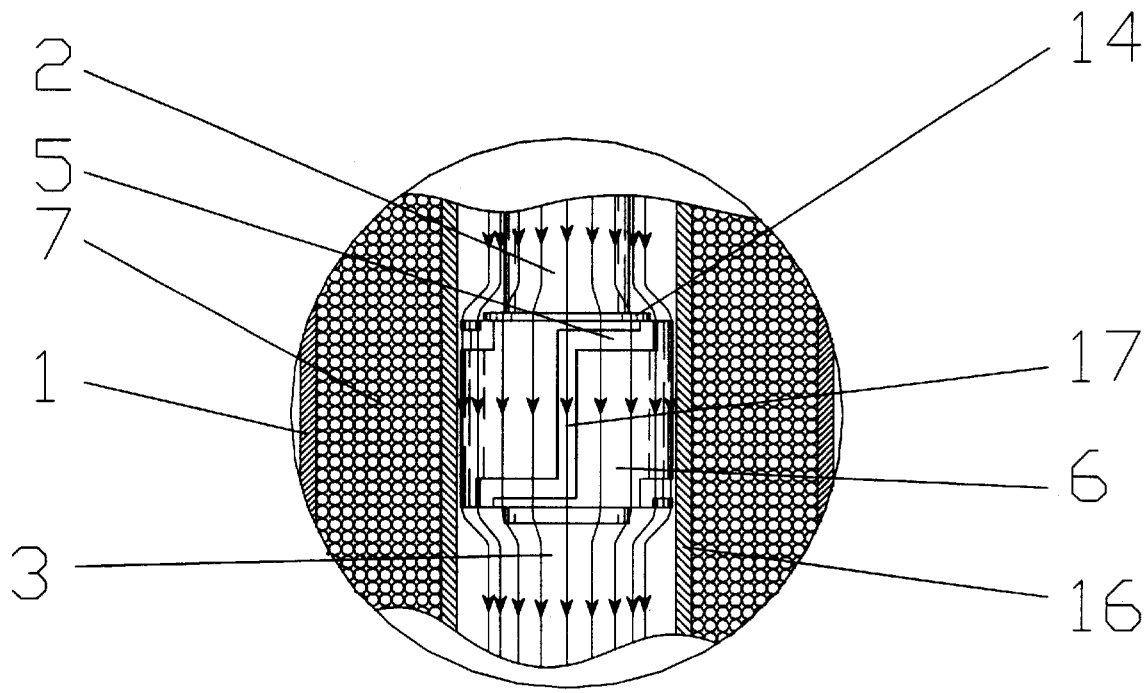
FIG. 5 is an enlarged partial cross-sectional view of the MRF damper of FIG. 1 with the piston and magnetic field lines in plan view rather than cross-sectional view.

FIG. 5 is an enlarged view of the MRF damper of FIG. 1. Here, the magnetic field lines 17 travel through the MRF and pass outside of the piston because of the ferromagnetic nature of the MRF. While not shown, the magnetic field may be slightly steered by the direction of the passages 5 containing the MRF. The passages 5 are formed on the exterior surface of the piston 6 to orient the flow of MRF. Here, the passages 5 include a horizontal (transverse) portion and a vertical (axial) portion. It is desired to have a portion of the passages 5 horizontal to provide resistance to the flow of the MRF chains. Here, increasing the length of the horizontal portion increases the resistance to the flow of the MRF chains. Thus, passages 5 being formed on the exterior surface of the piston 6 benefits from the increased available horizontal dimension available along the circumference of the piston 6.

As shown in FIGS. 1–5, the MRF damper comprises at least one housing 16 with at least one piston 6. The housing 16 and piston 6 are generally cylindrical in shape so that the piston 6 is movable within a cavity 3 defined in the housing 16. The cavity 3 of the housing 16 is filled with MRF to surround the piston 6 and to flow through the passage(s) 5 of the piston. As is known in the art, MRF forms chains of ferrous particle when subjected to a magnetic field. Thus, variations in the shape and strength of the magnetic field controls the material properties of the MRF(such as the yielded stress and the plastic viscosity). An electromagnet (such as a coil 7 of wire disposed around the housing 16 or a portion of the housing) can be used to easily vary the magnetic field in the housing 16 and in the piston 6 having the passages 5.

The MRF damper provides the MRF flow passage(s) 5 on the exterior surface of the piston substantially adjacent to the inner cylinder wall. This passage configuration takes advantage of the fact that the ferrous particles in the MRF form chain-like formations aligned with the magnetic flux lines. The chain-like formation of ferrous particles (MRF buildup) within the passage(s) 5 and provides an effective increase in the yielded stress and the plastic viscosity of the MRF within the MRF flow passages 5, thereby increasing the pressure drop between the two sides of the piston. The increased pressure drop across the two ends of the piston increases the damping (resisting) force.

One of the advantages of the present invention is that the magnetic flux does not need to flow through ferrous components to reach the MRF as required by conventional designs. In the MRF damper according to the present invention, the MRF flows through a passage 6 (or multiple passages) built into the piston 6. The MRF is activated and its physical properties, such as the yielded stress and the plastic viscosity, are controlled throughout cavity 3 defined in the housing 16 (or in a portion of the cavity 3) by variably adjusting the magnetic field generated by the coils 7. The materials of construction of the piston 6 and its passage 5 (or passages) can be non-magnetic, ferrous or a combination of both types of materials. Therefore, materials can be selected to best fit the specific application requirements. If the piston 6 is made of aluminum, ceramic, or plastic, for example, the total weight of the MRF damper can be significantly reduced as compared to dampers requiring ferrous materials. To ensure adequate magnetic flux in MRF, optimization of the magnetic field and the geometry of the passages 5 are desirable. Materials of construction whose hardness properties are high enough to reduce any abrasive effects of MRF may also be utilized.

In addition, the diameter of the MRF flow passages 5 can be large as compared to those in convention dampers. Therefore, the geometry of the passages 5 can be varied to a much greater extent as compared to conventional designs. The less-restrictive dimensional tolerances required for the manufacturing of components containing MRF flow passages 5 are easier to manufacture and, therefore, less expensive. In addition, the passages 5 can be easily formed on the surface of the piston 6. Moreover, the structure of the piston 6 is simplified and can easily be manufactured. Abrasive effects are also minimized when restrictively small dimensional tolerances are no longer present.

Figure 8A:
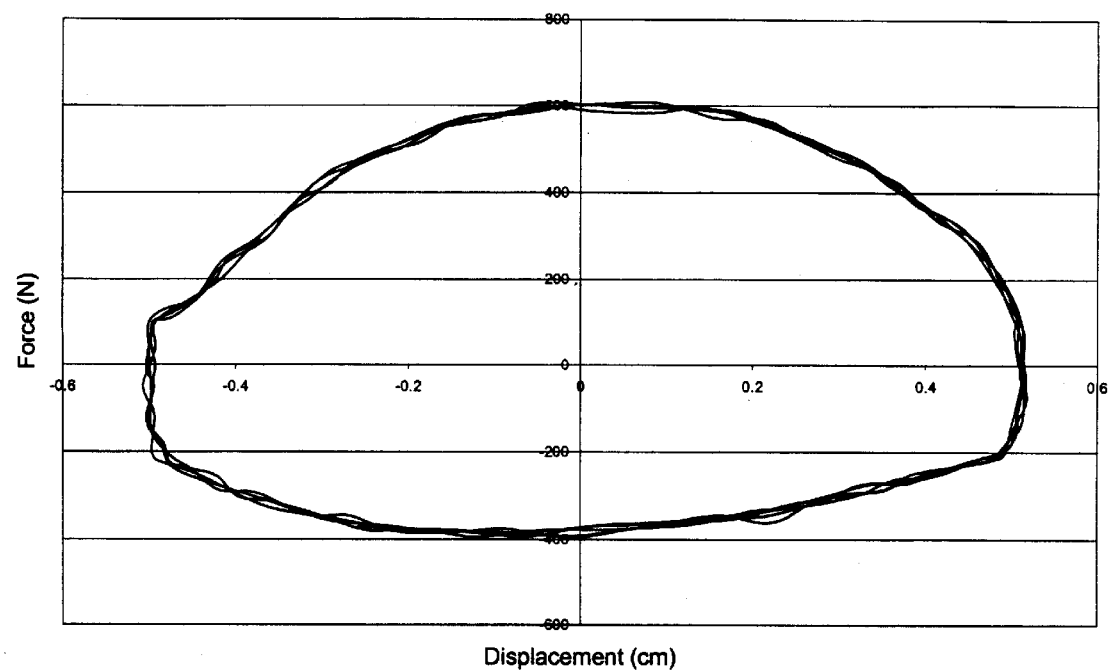
FIGS. 8a and 8b are graphs illustrating experimental data of force-displacement and force-velocity measurements, respectively, for an original equipment manufacture (OEM) shock absorber in an automotive vehicle.
Figure 8B:
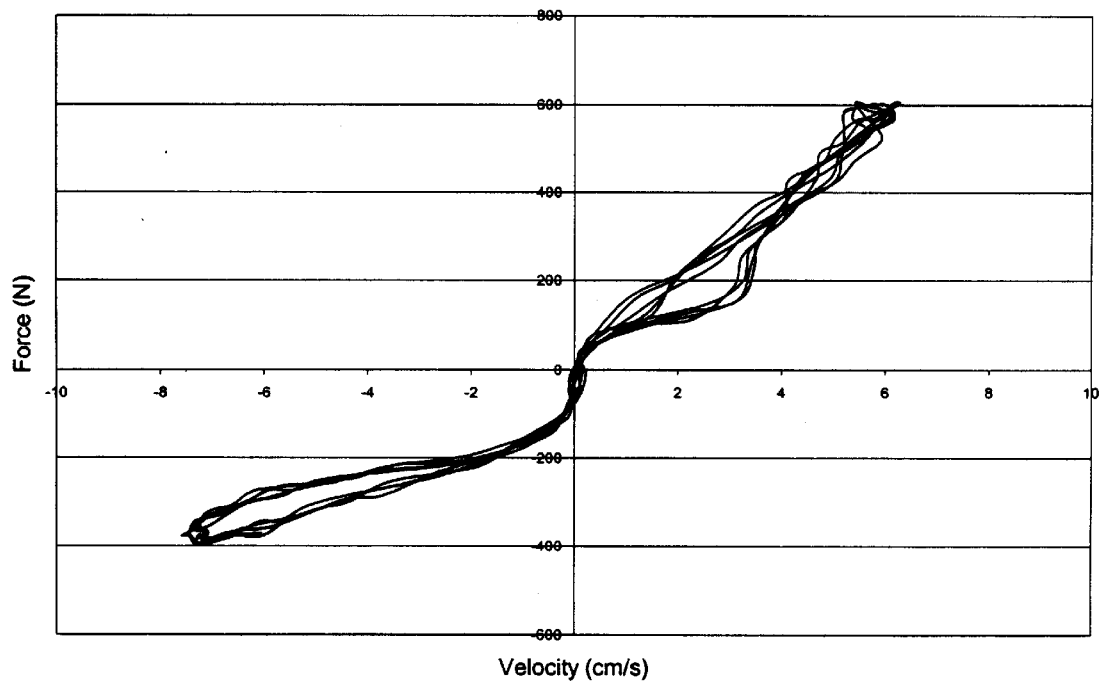
Figure 9A:
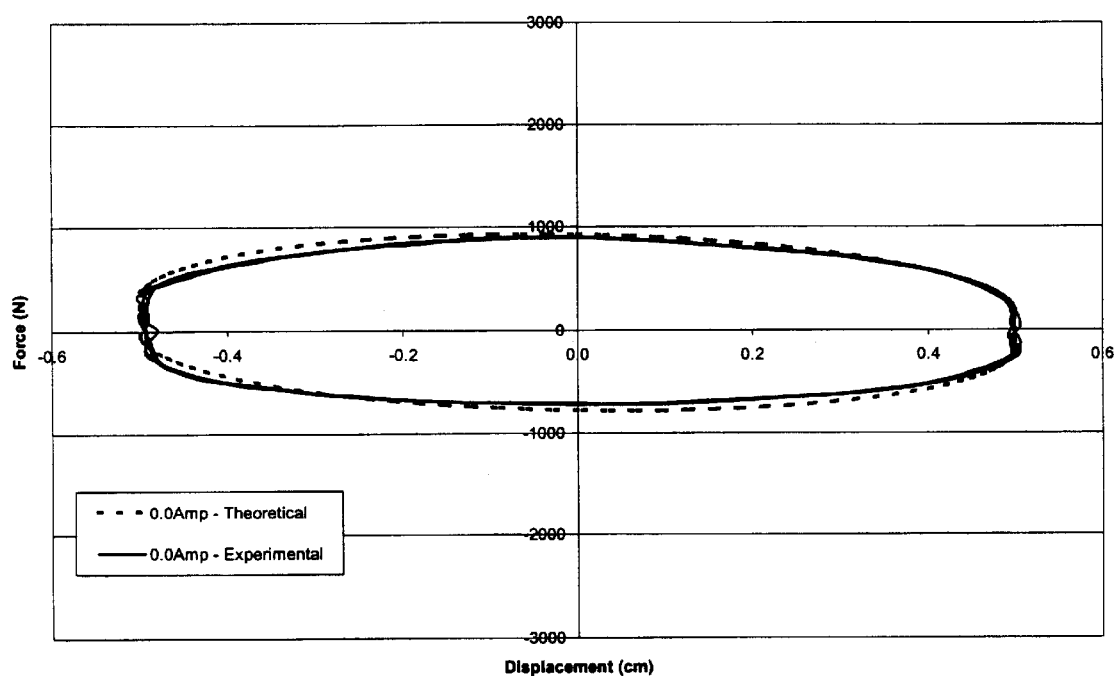
FIGS. 9a and 9b are graphs illustrating experimental data of force-displacement and force-velocity measurements, respectively, for an MRF damper according to FIG. 1 of the present invention with no current applied to the electromagnet.
Figure 9B:
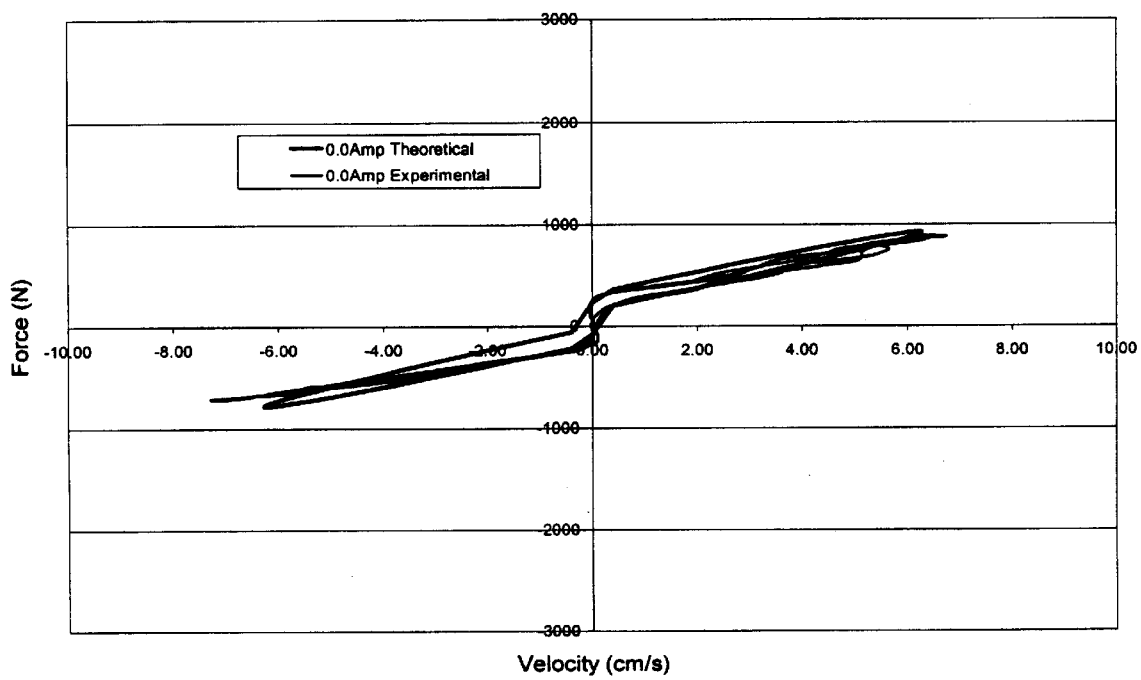
Figure 10A:
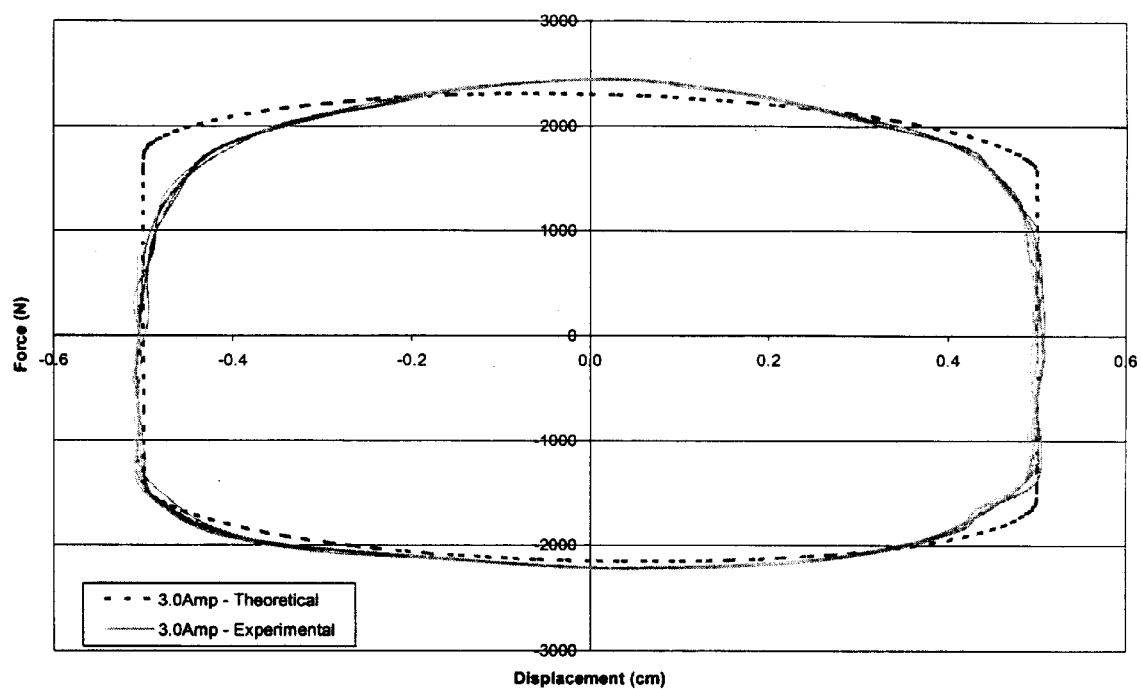
FIGS. 10a and 10b are graphs illustrating experimental data of force-displacement and force-velocity measurements, respectively, for the MRF damper of FIGS. 9a and 9b with current applied to the electromagnet.
Figure 10B:
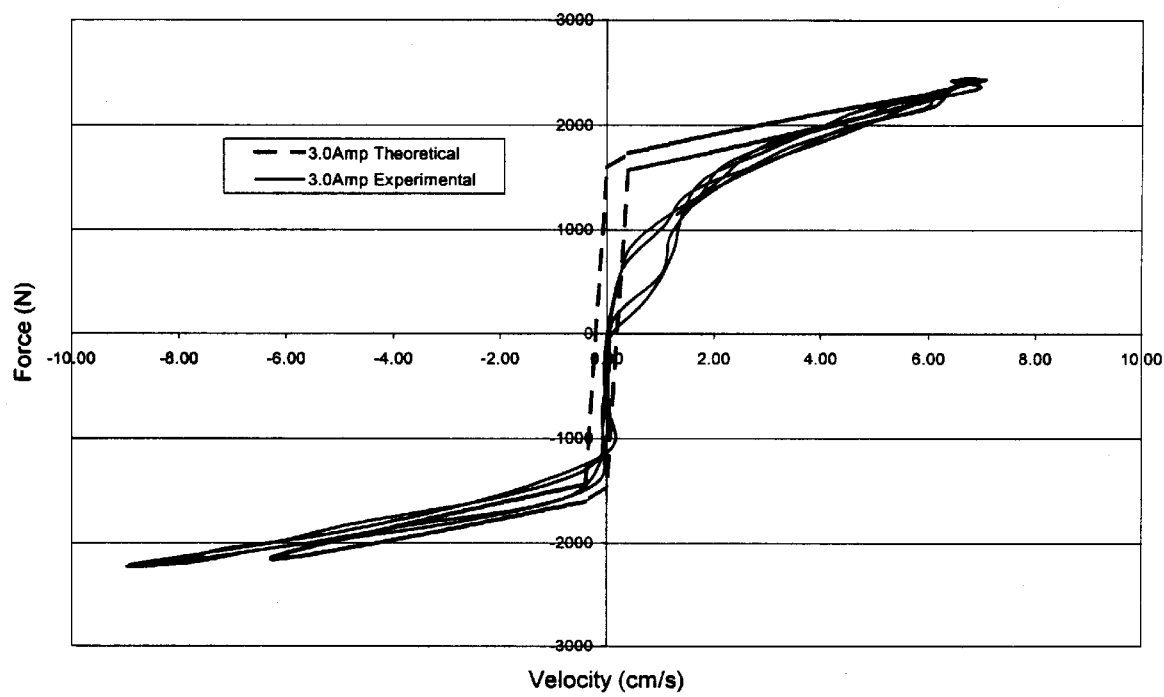

An MRF damper according to the embodiment of FIG. 1 was constructed and tested. For comparison, a stock original equipment manufacture (OEM) shock absorber for HMMWV (High Mobility, Multi-purpose Wheeled Vehicle) was tested using the same experimental setup. FIGS. 8a and 8b show force-displacement and force-velocity graphs the OEM shock absorber at a frequency of 2 Hz with 1.0 cm peak-to-peak displacement. FIGS. 9a and 9b show the force-displacement and force-velocity graphs of a 38 cm (15 in) long MRF damper with a 10 cm (4 in) cavity diameter at a frequency of 2 HZ with 1.0 cm peak-to-peak displacement and no current applied to the electromagnet coil (no magnetic field). With the MRF damper of the present invention, a 900N (200 lb) maximum force was generated at a frequency of 2 Hz and a peak-to-peak amplitude of 1.0 cm (0.4 in) when the damper was at zero field (0.0 Amp input). Using a parametric theoretical model, the experimental results were accurately predicted. As can be seen in FIGS. 10a and 10b, after activating the MRF damper by applying 3A and 10V of electric power to the electromagnet 7, the maximum force produced by the damper increased to 2300N (520 lb). Thus, the damping force is increased by more than 100% by increasing the applied current from 0.0 A to 3.0 A.

Figure 11:
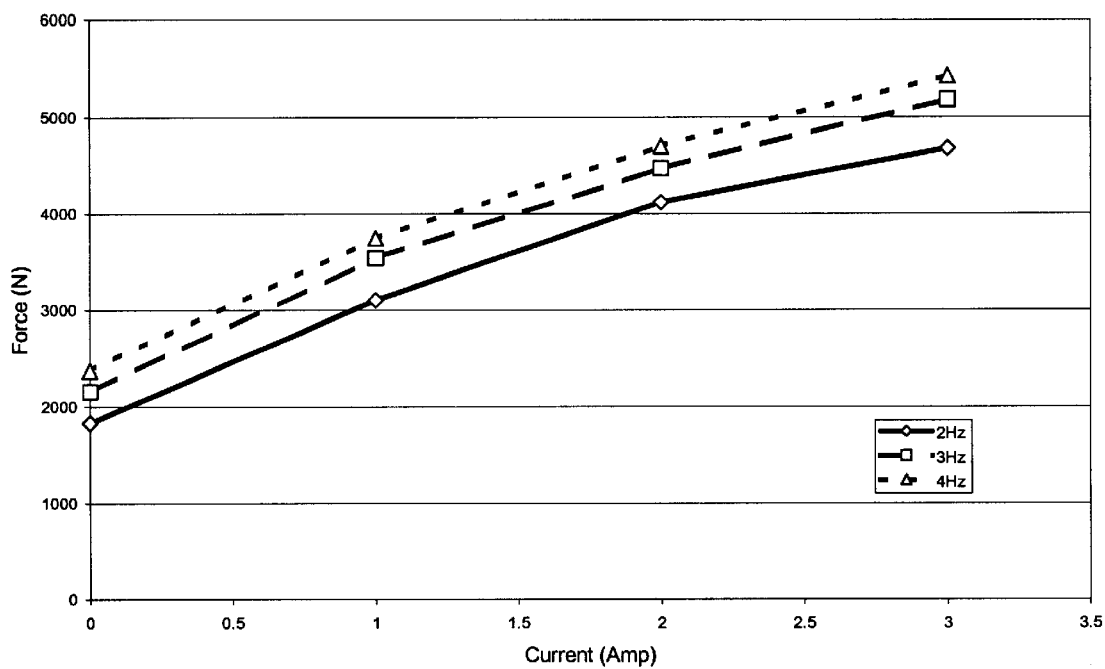
FIG. 11 is a graph of damping force versus input electric current applied to the MRF damper of FIGS. 9a and 9b for different frequency tests.
Figure 12:
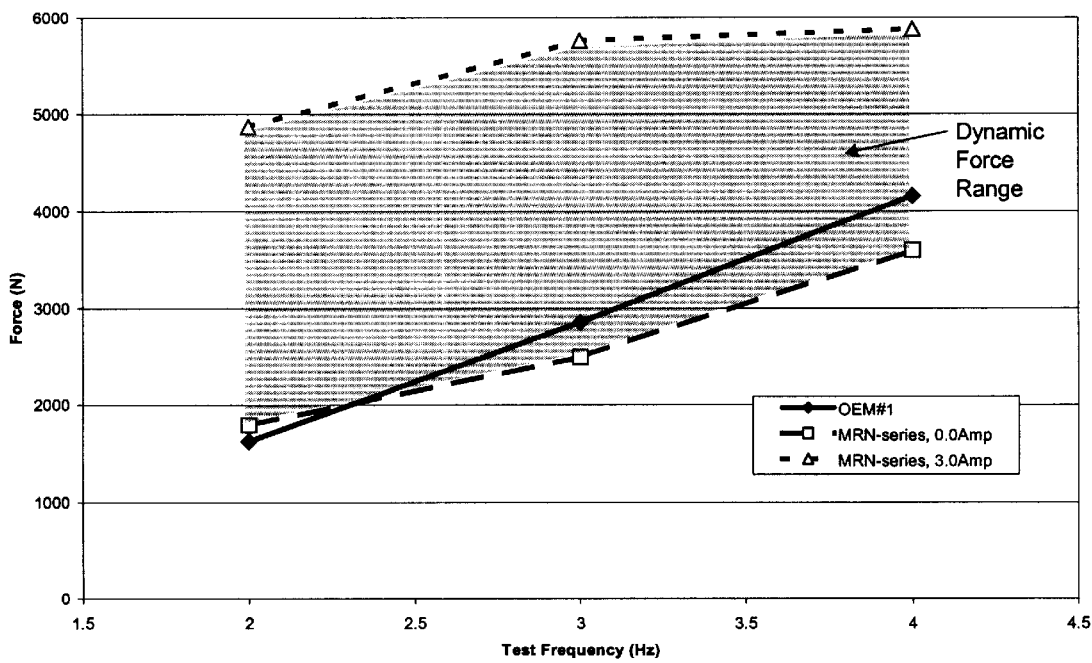
FIG. 12 is a graph of force versus frequency for the MRF damper of FIG. 9a and 9b as compared to the OEM shock absorber of FIGS. 8a and 8b.

FIG. 11 illustrates peak-to-peak damping force as a function of electrical current applied to the MRF damper for various testing frequencies. As current increases, the damping force also increased. FIG. 12 shows the controllable dynamic force range of the MRF damper as compared to the fixed force range of the non-controllable (passive) OEM shock absorber.

The theoretical model also was developed based on the mechanics of the MRF damper. The simplified mathematical force balance equation used to model damper performance can be expressed as:

$$f_{DAMPER} = K_1 V + \frac{L}{D} K_2 I^\delta \qquad (1)$$

where:

$K_1$ is the viscous damping coefficient;

V is the input velocity of the piston;

L is the length of the MRF passage(s) of the piston;

D is the effective hydraulic diameter of the MR passages of the piston;

$K_2$ is the MRF shear stress constant;

I is the electrical current applied to the electromagnet; and

δ is the magnetic field power index.

Here, the terms $K_2$ and δ depend not only on the physical properties on the MRF but also on the configuration of the passage and electromagnet. This theoretical model can define behavior of any size damper of this type simply by changing the physical parameters of the model. It is also evident from Equation (1) that by changing the length and/or diameter of the MRF passage(s) the damping force can be varied drastically. Also, optimization of the electromagnet can be performed on an application-specific basis to assure the proper range of field strength is achieved. FIGS. 9a and 9b and FIGS. 10a and 10b illustrate experimental versus theoretical comparisons of force-displacement and force-velocity results. It is evident by the closeness of the results that the theoretical model has the capability to accurately model behavior of this type of MRF damper. This theoretical model allows for custom design of dampers.

Figure 6A:
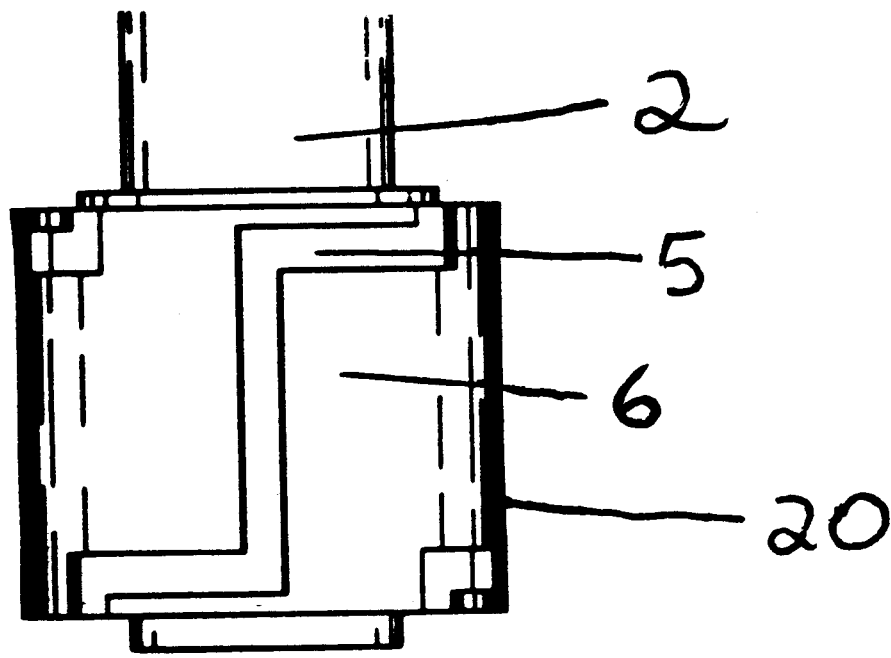
FIG. 6a is a partial cross-section view of a piston body having a sleeve in an MRF damper according to another embodiment of the present invention.

FIG. 6a shows a piston body of another embodiment of the present invention. The piston body includes a piston portion 6 having the passage 5 formed on the exterior surface of the piston portion 6. The piston body further comprises a sleeve 20 disposed on the exterior surface of the piston portion 6. The sleeve 20 can be fixed to the piston body 6 to prevent wear or abrasion. However, because the passage 5 is formed on the exterior surface of the piston body 6, it is easy to manufacture.

Figure 6B:
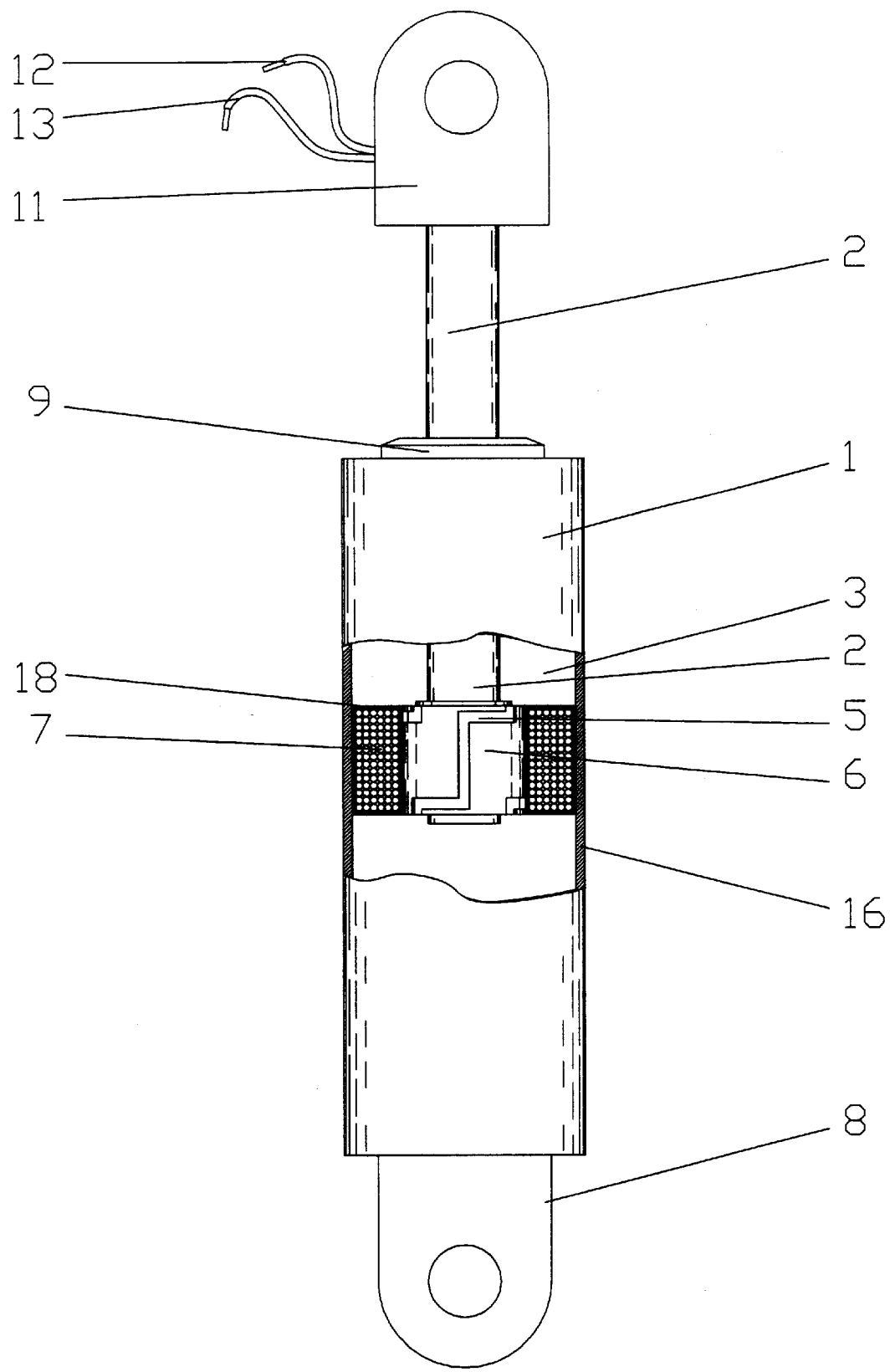
FIG. 6b is a partial cross-sectional view of an MRF damper according to another embodiment of the present invention having an electromagnet on the exterior of the piston.

FIG. 6b illustrates another embodiment of the present invention. In the embodiment of FIG. 6, a piston body 6 includes a piston portion 6 and a coil 7. The piston portion 6 includes passages 5 on the surface, and the coil 7 surrounds the piston portion 6. Preferably, the piston body has a housing 18 to protect the coil 7. Two wire leads 12, 13 are preferably disposed through the piston shaft 2 and to become external the device on the mount 11, thereby providing access to an external power source. Alternatively, the cover 1 can be integral with the housing 16, or the cover 1 and housing 16 can be two separate components—one being the housing 16 and the other being the cover 1.

Figure 7:
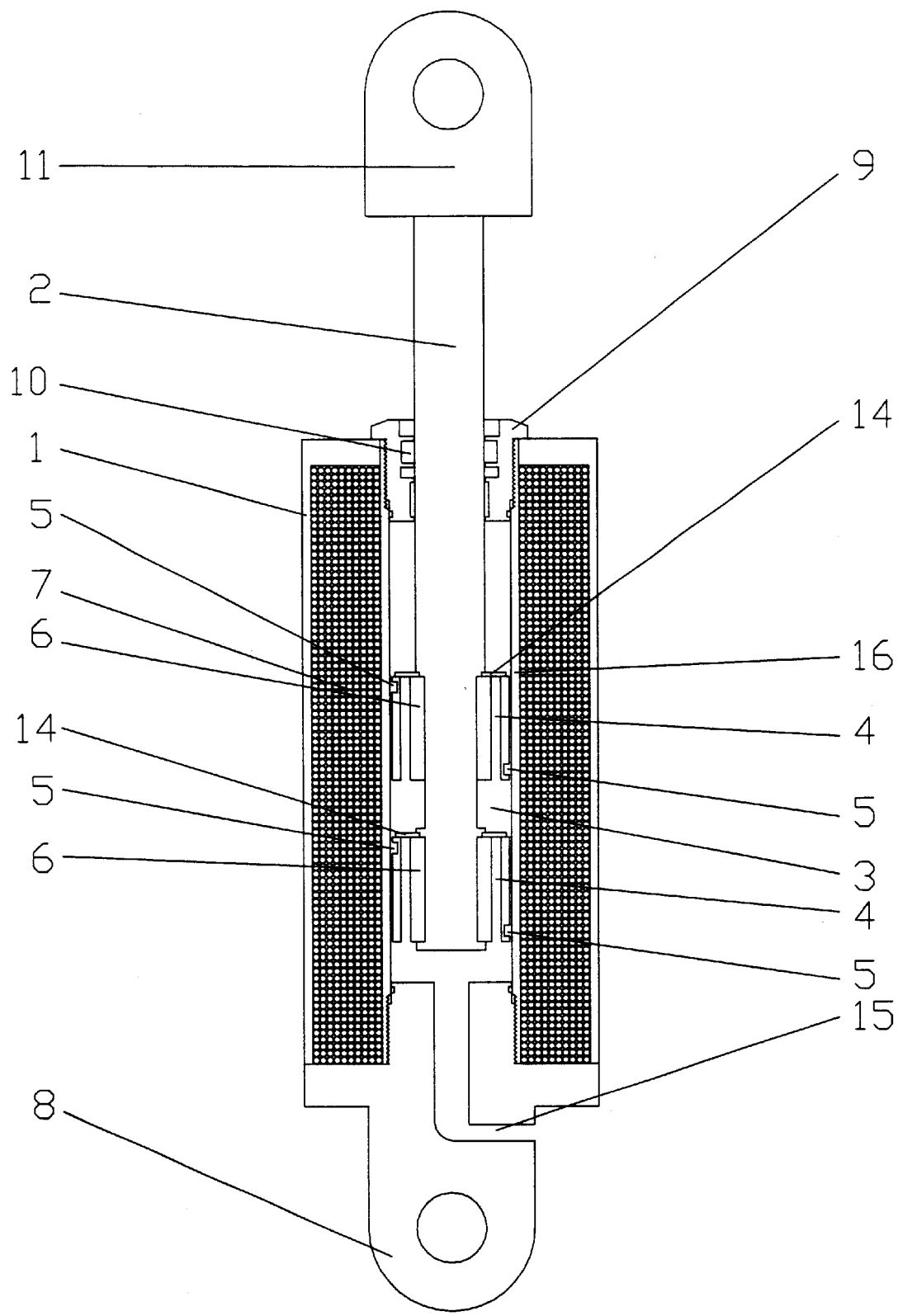
FIG. 7 is a partial cross-sectional view of an MRF damper according to another embodiment of the present invention having more than one piston.

FIG. 7 shows another embodiment of the present invention. In FIG. 7, the MRF damper has two pistons 6 mounted to shaft 2. Two sets of passages 5 on the piston 6 exist to serve as MRF controllable valves. One-way compression valves 14 exist on each piston 6 to provide different compression and rebound characteristics. Each valve 14 controls fluid flow through return ports 4 within piston 6 to provide the different compression and rebound characteristics.

The configuration of MRF damper can be varied in a number of additional ways. For example, the housing 16 may be formed using either non-ferrous or ferrous materials or a combination of both types of materials. Similarly, the piston 6 (or piston body) can be manufactured from either non-ferrous or ferrous materials or a combination of both types of materials. If ferrous materials are used in the vicinity of the passages 5, it is preferred that the magnetic field strength is sufficiently strong to saturate the ferrous material so that the MRF is sufficiently subjected to the magnetic field.

In addition, a plurality of electromagnetic coil units 7 may be used or permanent magnets may be used in place of the electromagnetic coil units 7 or in conjunction with the electromagnetic coil units 7. Alternatively, an electromagnet to counteract the constant magnetic field of a permanent magnet can be used to produce a reverse controlled mode.

Moreover, the MRF flow passages 5 can be formed on the exterior surface of the piston 6 in straight segments, in curved configurations, in spirals, portions of spirals, staircases, or other suitable shapes. Thus, the transverse portions of the flow passages 6 do not need to be perpendicular to the magnetic field and can be located in the pistons, housings, or passages external or internal to the device.

Furthermore, while the piston motion is defined as being axial, the piston motion can be rotary or combinations of linear and rotary motions.

In commercial applications, MRF damper may be altered to reduce and/or optimize costs and construction requirements. Some elements of designs may be omitted and others added to achieve the same result. For example, seals incorporated within piston caps or bleed screws may or may not be required. The design may have more than two cavities. Here, the design may consist of a plurality of independent and/or dependent MRF cavities, which may extend in any direction or dimension. Also, springs or spring-like materials can be employed in series or parallel to construct a spring-dash pot damping device.

As described above, the MRF damper according to the present invention controls the yielded stress and the plastic viscosity of the magneto-rheological fluid (MRF) in a unique manner, thereby providing a number of innovations and advantages.

For example, the design does not mandate the use of ferrous materials in its construction. Unlike conventional MRF dampers that energize the MRF only in a highly localized region in the piston, this design applies a magnetic field at all portions or specific portions within the cavity where MRF chains are desired. Thus, the MRF that passes through or across the piston during compression or rebound of the damper can be magnetically saturated in a large region prior, during, and/or after passing through or across the piston.

Accordingly, the MRF damper directs the MRF chains to flow passages through the piston. The MRF is introduced to the magnetic field prior to engagement with the piston. MRF is then routed though the piston so that it is substantially perpendicular to the magnetic field one:or more times. The increased the yielded stress and the plastic viscosity of the MRF flowing in the direction substantially perpendicular to the magnetic field results in a higher damping force. The size of the passageways in the piston may be large or small and can be shaped or located in any manner relative to the piston to achieve the desired range of controllable damping.

In addition, the MRF damper of the present invention provides variable control of MRF flow of MRF in passages within the MRF dampers. The MRF damper has a number of distinct characteristics. For example, the passages are configured to alter the flow of MRF as to increase and/or decrease the force generated to resist motion for the desire application. Also, non-ferrous materials can be used in the manufacturing of the components of an MRF damper. Further, the passages through which MRF flows from one housing to the other can be significantly larger than those described in prior art MRF damper designs.

It will be apparent to those skilled in the art that various modifications and variations can be made in the MRF damper of the present invention without departing from the spirit or scope of the invention. Thus, it is intended that the present invention cover the modifications and variations of this invention provided they come within the scope of the appended claims and their equivalents.

What is claimed is:

1. A magneto-rheological fluid device, comprising:
   a housing defining a cavity;
   a piston slidably disposed in the cavity, the piston dividing the cavity into first and second portions;
   a passage defined on an exterior surface of the piston fluidly coupling the first and second portions of the cavity;
   a magneto-rheological fluid disposed in the cavity such that motion of the piston is damped by flow of the magneto-rheological fluid through the passage; and
   a magnet disposed to produce a magnetic field within the cavity substantially parallel to the motion of the piston at the exterior surface of the piston.

2. The magneto-rheological fluid device according to claim 1, wherein the piston is formed of a non-magnetic material.

3. The magneto-rheological fluid device according to claim 2, wherein the housing is formed of a non-magnetic material.

4. The magneto-rheological fluid device according to claim 2, wherein amount of damping varies according to a magnitude of the magnetic field.

5. The magneto-rheological fluid device according to claim 1, wherein the housing is formed of a ferrous material.

6. The magneto-rheological fluid device according to claim 1, further comprising a second piston slidably disposed in the cavity, the second piston further dividing the cavity into a third portion.

7. The magneto-rheological fluid device according to claim 1, wherein amount of damping varies according to a magnitude of the magnetic field.

8. The magneto-rheological fluid device according to claim 1, wherein the magnet includes an electromagnet.

9. The magneto-rheological fluid device according to claim 1, wherein the magnet is disposed around the housing.

10. The magneto-rheological fluid device according to claim 1, wherein the magnet is disposed around the piston in a piston body.

11. The magneto-rheological fluid device according to claim 1, wherein a sleeve is disposed around the piston in a piston body.

12. The magneto-rheological fluid device according to claim 1, wherein the passage includes an axial portion and a transverse portion formed on the exterior surface of the piston.

13. The magneto-rheological fluid device according to claim 12, wherein the transverse portion is formed along a circumference of the piston.

14. The magneto-rheological fluid device according to claim 1, wherein the magneto-rheological fluid forms chains parallel to the passage in response to the magnetic field.

15. The magneto-rheological fluid device according to claim 1, further comprising an end cap.

16. The magneto-rheological fluid device according to claim 15, wherein the end cap includes a ferrous material to direct the magnetic field.

17. The magneto-rheological fluid device according to claim 1, further comprising a cover disposed around the magnet.

18. The magneto-rheological fluid device according to claim 17, wherein the cover is formed of a ferrous material to provide a return path for the magnetic field.

* * * * *